United States Patent
Kalm

[11] Patent Number: 5,906,268
[45] Date of Patent: May 25, 1999

[54] SENSOR ROLLER

[75] Inventor: W. Scott Kalm, Plano, Tex.

[73] Assignee: Siemens ElectroCom L.P., Arlington, Tex.

[21] Appl. No.: 08/803,829

[22] Filed: Feb. 24, 1997

[51] Int. Cl.$^6$ ................................................. B65G 13/06
[52] U.S. Cl. .................................. 198/781.06; 198/781.01
[58] Field of Search ........................ 198/781.06, 781.01; 29/116

[56] References Cited

U.S. PATENT DOCUMENTS

| | | | |
|---|---|---|---|
| 1,771,907 | 7/1930 | Abramson . | |
| 2,057,380 | 10/1936 | Keefe | 200/100 |
| 2,675,435 | 4/1954 | Framhein | 200/5 |
| 3,129,804 | 4/1964 | Niekamp | 198/37 |
| 3,251,458 | 5/1966 | Niekamp et al. | 198/232 |
| 3,724,642 | 4/1973 | De Good | 198/781.06 |
| 3,860,106 | 1/1975 | Cooley | 198/127 R |
| 4,154,995 | 5/1979 | Kantarian et al. | 200/61.41 |
| 4,168,413 | 9/1979 | Halpine | 200/82 E |
| 4,174,777 | 11/1979 | Riehle | 198/781.06 |
| 4,392,568 | 7/1983 | Turnbough et al. | 198/781.06 |
| 4,509,237 | 4/1985 | Volz et al. | 29/116 |
| 4,605,120 | 8/1986 | Vanderlinde | 198/791 |
| 4,729,153 | 3/1988 | Pav et al. | 29/116 |
| 4,856,359 | 8/1989 | Krause | 74/110 |
| 4,898,012 | 2/1990 | Jones et al. | 29/116 |
| 5,006,901 | 4/1991 | Dick | 335/258 |
| 5,038,922 | 8/1991 | Collins et al. | 198/781 |
| 5,060,785 | 10/1991 | Garrity | 198/781 |
| 5,201,397 | 4/1993 | Issacs | 198/395 |
| 5,285,887 | 2/1994 | Hall | 198/460 |
| 5,348,139 | 9/1994 | Szarkowski et al. | 198/781 |
| 5,358,097 | 10/1994 | Bakkila et al. | 198/781.06 |
| 5,456,448 | 10/1995 | Chou | 251/230 |
| 5,562,027 | 10/1996 | Moore | 100/35 |
| 5,582,286 | 12/1996 | Kalm et al. | 198/781.06 |
| 5,582,287 | 12/1996 | Heit et al. | 198/803.01 |

OTHER PUBLICATIONS

Itoh Power Moller, Simfy Systems, Inc., Cranbury, N.J., Jan., 1993. A brochure describing internally motorized conveyor rollers.

Interroll, The Driving Force, Introducing Intelliveyor, Interroll Corp., Wilmington, North Carolina, publication date not given. A brochure describing an electronic conveyor control module.

Interroll Meca, Interroll Corp., Wilmington, North Carolina, 1992. A brochure describing an electric conveyor roller.

*Primary Examiner*—Johnny D. Cherry
*Assistant Examiner*—Steven B. McAllister
*Attorney, Agent, or Firm*—Philiip G. Meyers

[57] ABSTRACT

A sensor roller and method for detecting the presence of a tray located thereon, where the tray is traveling along a conveyor system, includes a housing having an interior chamber and a plurality of apertures. The apertures are in one-to-one correspondence with actuators, where the actuators each have an exposed portion protruding through the apertures. The sensor roller further includes a piston slidable in the interior chamber of the housing and engaging the actuators. The piston slides between a non-actuated position to an actuated position in response to a tray travelling along the conveyor system depressing an actuator into the interior chamber of the housing. A sensor detects the presence of the piston in the actuated position and generates a detection signal in response thereto.

15 Claims, 5 Drawing Sheets

SENSOR ROLLER

TECHNICAL FIELD

The present invention relates to a sensor roller for a conveyor system and, more particularly, to a sensor roller for detecting the presence of an object, e.g., a tray travelling along a conveyor system.

BACKGROUND OF THE INVENTION

The movement of large numbers of objects, such as product units, trays or pallets, around a processing or manufacturing facility has long been executed by conveyor systems. Presently, most conveyor systems that move product units around a processing facility utilize fixed components having a particular configuration that is not easily changed. The problem of having fixed components within the conveyor system is that when manufacturing and processing requirements change the reconfiguration of the conveyor system is not easily achieved.

Presently, fixed components of the conveyor systems often include a combination of photocells and reflectors to determine the presence of objects on a particular section of the conveyor system. To relocate the photocells and reflectors upon reconfiguration of the conveyor system is a timely and costly operation.

Conventional conveyor systems in use today also utilize pivot plates that are located between rollers to indicate the presence of an object. Each pivot plate has one end which contacts a passing object and another end that activates a sensor. The pivot plates, being movable mechanical equipment, require considerable maintenance and set-up time to ensure proper functioning not to mention the time associated with relocating the pivot plates due to reconfiguration of the conveyor system.

Also, in the event the dimensions of an object vary then the spacing between rollers may change thereby requiring relocation of photocells or pivot plates.

Accordingly, there is a need for a sensor roller to minimize the use of photocells and pivot plates to indicate the presence of an object in a particular conveyor section. Also there is a need for a sensor roller that permits customized spacing between the rollers without relocating photocells or pivot plates. These and other needs are addressed by the sensor roller of the present invention.

SUMMARY OF THE INVENTION

The present invention relates to a sensor roller and method for detecting the presence of an object moving along a conveyor system. The sensor roller includes a cylindrical housing having an interior chamber and a plurality of apertures. The apertures are in one-to-one correspondence with actuators, where the actuators have an exposed portion protruding through the apertures. The sensor roller further includes a piston disposed in the interior chamber of the cylindrical housing and responsive to movement of the actuators. The cylinder moves between an actuated position and a non-actuated position such that when the object traveling along the conveyor system contacts and depresses an actuator into the interior chamber the piston moves from the non-actuated position to the actuated position until the tray has cleared the sensor roller. A sensor detects movement of the piston to the actuated position and generates a detection signal in response thereto.

In accordance with the present invention there is provided a sensor roller that reduces the time and effort associated with the reconfiguration of a conveyor system.

BRIEF DESCRIPTION OF THE DRAWINGS

A more complete understanding of the invention may be had by reference to the following Detailed Description when taken in conjunction with the accompanying Drawings wherein.

DETAILED DESCRIPTION OF THE DRAWINGS

Figure 1:
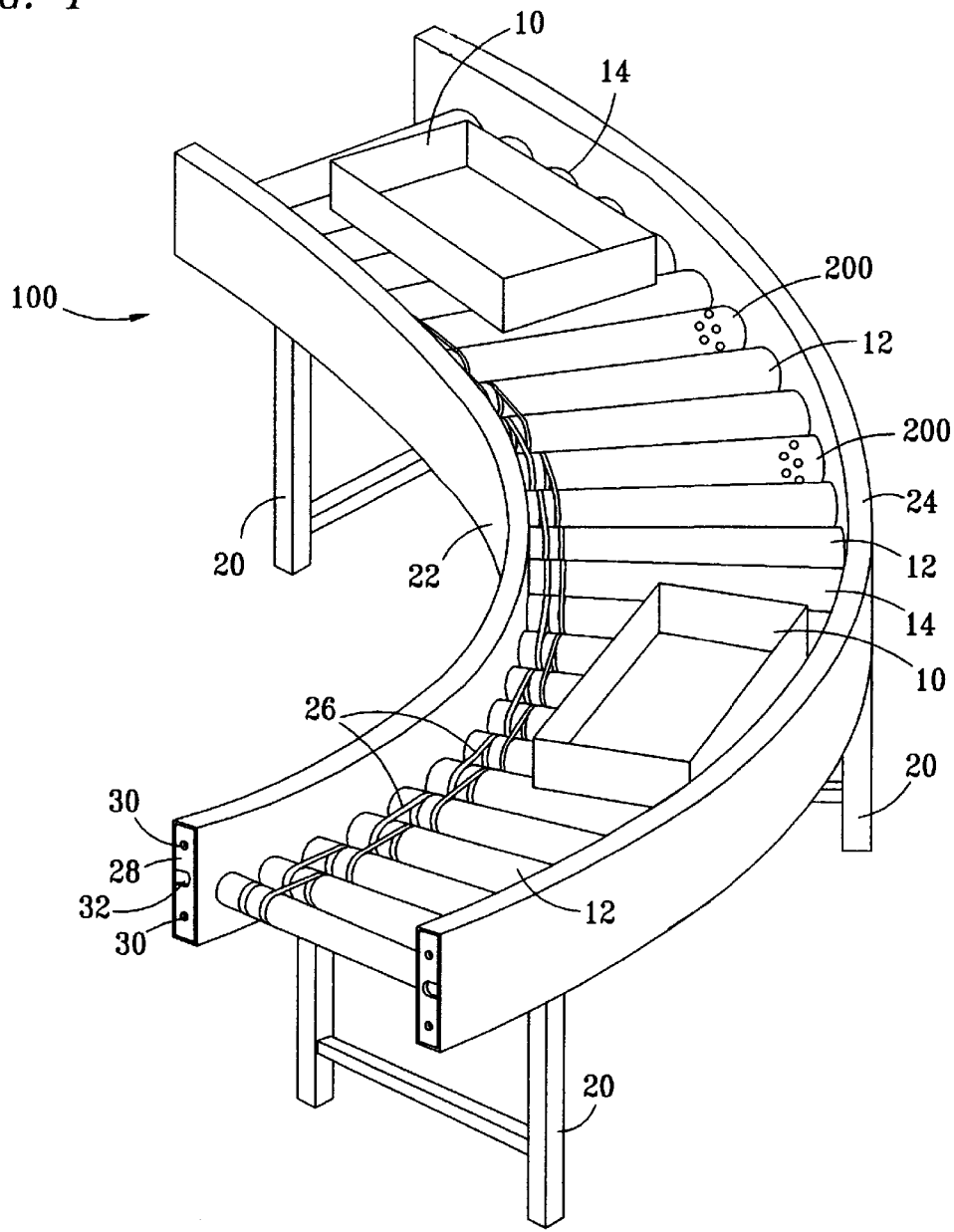
FIG. 1 is a perspective view of one section of a conveyor system incorporating sensor rollers of the present invention.

Referring to the Drawings, wherein like numerals represent like parts throughout the several views, there is disclosed a sensor roller 200 in accordance with the present invention.

Although two embodiments of the sensor roller 200 incorporated with a conveyor section 100 will be discussed, those skilled in the art will appreciate that such embodiments are only two of many utilizing the principles of the present invention. Accordingly, the sensor roller 200 described should not be construed in a limiting manner.

A modular power roller conveyor system such as illustrated and described in U.S. Pat. No. 5,582,286 has photocells and reflectors to indicate the presence of a tray in a particular section. The modular power roller conveyor system as disclosed in U.S. Pat. No. 5,582,286 is incorporated into this specification. A detailed description of the sensor roller 200 will be discussed after detailing the interaction of the sensor roller with the conveyor section 100.

Referring to FIG. 1, there is illustrated a perspective view of the curved conveyor section 100 having two sensor rollers 200. The conveyor section 100 has a curvature to change the direction of travel of a tray 10 by 90°. It is important to note that while this particular conveyor section illustrates a 90° turn, a turn from anywhere between 0° and 180° may include the sensor roller 200 of the present invention. The curved conveyor section 100 is supported by legs 20 and consist of a left side rail 22 and a right side rail 24. A combination of idler rollers 12, drive rollers 14 and the sensor rollers 200 are mounted between the left side rail 22 and the right side rail 24. The idler rollers 12 and drive rollers 14 may be of the type manufactured by Interroll Corporation and identified as model Driverroll. The idler rollers 12, drive rollers 14 and sensor rollers 200 are interconnected by a plurality of O-ring bands 26 such that operation of a drive roller will cause rotation of any idler rollers or sensor rollers connected thereto.

The idler rollers 12 and drive rollers 14 have similar outward appearances; however, the drive rollers further include internal gearing and an electric motor. The drive rollers 14 are preferably twenty-four volt electric conveyor rollers.

The side rails 22 and 24 have a cross-sectional shape that defines a raceway for placement of power and control conductors (not shown). Mounted to the side rails 22 and 24 at each end of the conveyor section 100 are internal connecting brackets 28 with holes 30 for fasteners to enable the conveyor section 100 to be interconnected with other conveyor sections to form a conveyor system.

Figure 2:
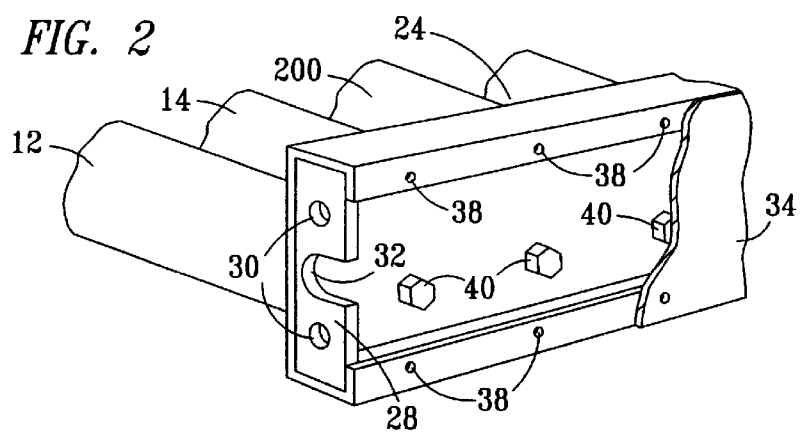
FIG. 2 is a cut-away representation of one side rail and several rollers of the section of FIG. 1.

Referring to FIG. 2, there is shown a cut-away representation of the right side rail 24, and several rollers 12, 14, or 200, and the internal connecting bracket 28. An opening 32 in the internal connecting bracket 28 allows wire connection between electrical components of adjacent conveyor sections 100. A cover 34 protects the raceway, and is connected to the right side rail 24 with single-turn screws (not shown) and rifled holes 38. The shafts 204 on which the rollers 12, 14 and 200 turn are spring loaded at one end 40, and the spring loaded end passes through holes in the right side rail 24.

Figure 3:
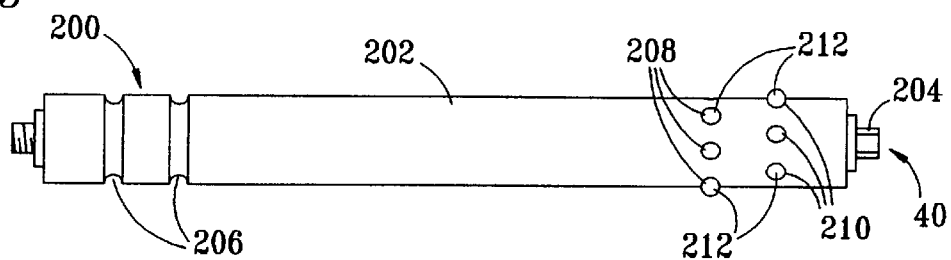
FIG. 3 is a side view of a first embodiment of the sensor roller.

Referring to FIG. 3, there is shown a side view of a first embodiment of the sensor roller 200. The sensor roller 200 has a cylindrical housing 202 that is preferably fabricated from a galvanized steel tube; however, other materials are acceptable. The shaft 204 of the sensor roller 200 is spring loaded at end 40 permitting easy removal and mounting of the sensor roller 200 within the side rails 22 and 24. Each sensor roller 200 further includes a pair of channels 206 for placement of the O-ring bands 26 (FIG. 1) to interconnect adjacent rollers. Included in the cylindrical housing 202 are a plurality of apertures distributed in a first circumferential row 208 and a second circumferential row 210. The apertures of the circumferential rows 208 and 210 each include a spherical actuator 212 protruding from the surface of the cylindrical housing (FIGS. 5A and 5B).

Figure 4A:
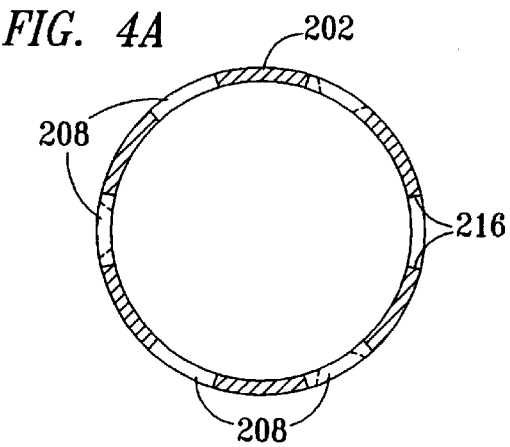
FIGS. 4A and 4B are cross-sectional views of the first and second rows of apertures of the sensor roller of FIG. 3.
Figure 4B:
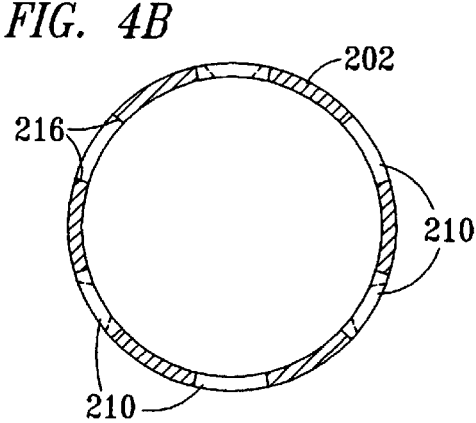

Referring to FIGS. 4A and 4B, there are illustrated cross-sectional views of the first row 208 of apertures and the second row 210 of apertures, respectively. Each row 208 and 210 preferably has six apertures with corresponding actuators (not shown). The first and second rows 208 and 210 of apertures are separated from one another by approximately 60° from center-to-center. The diameter of the apertures in the rows 208 and 210 are sized such that an opening appears in the surface of the housing 202 over a majority of the circumference. This is accomplished by offsetting the apertures between rows 208 and 210 by half a diameter. However, other configurations and separation schemes for the apertures are permissible so long as the presence of a tray 10 located on the sensor roller 200 is positively ascertained.

Each aperture in the first row 208 and the second row 210 of the first embodiment preferably has a circular opening with a tapered side 216 to permit an exposed portion of the spherical actuator 212 to protrude therefrom. The tapered side 216 also rotatably retains a portion of the actuator 212 within an interior chamber 222, illustrated in FIGS. 5A and 5B.

Figure 5A:
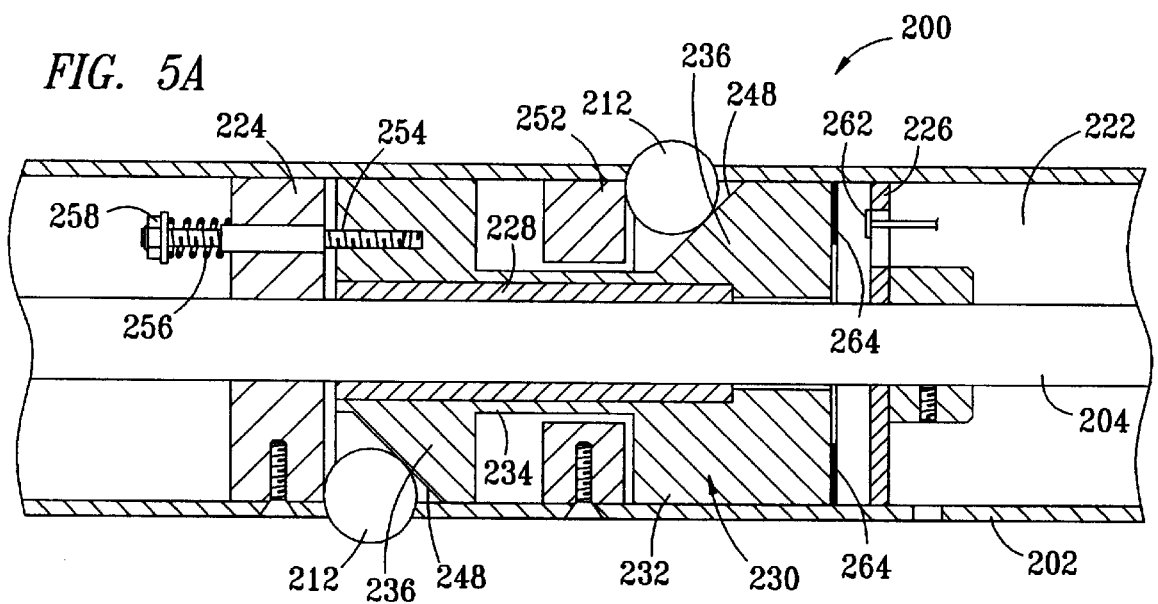
FIGS. 5A and 5B are lateral cross-section views of the sensor roller illustrated in FIG. 3, where the sensor roller is in the non-actuated position and actuated position, respectively.
Figure 5B:
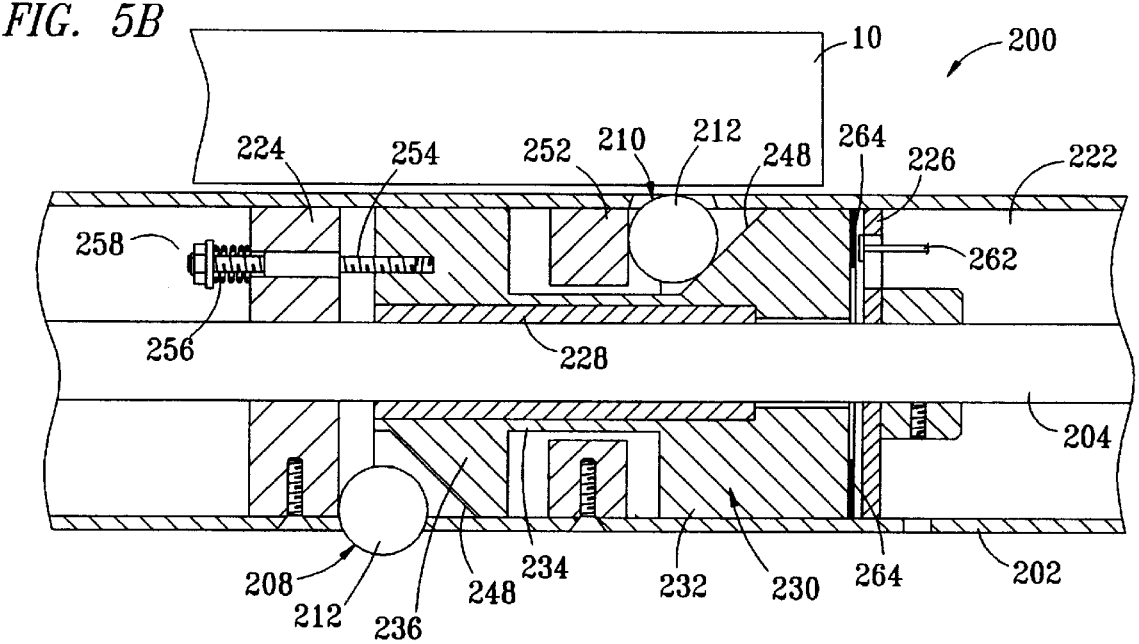

Referring to FIGS. 5A and 5B, there are illustrated lateral cross-section views of the sensor roller 200 in the non-actuated position and the actuated position, respectively.

Located within the interior chamber 222 are a first retainer 224 and a second retainer 226 having a piston 230 slideably positioned between the retainers. The first retainer 224 is connected to the housing 202 (FIGS. 5A and 5B) and the second retainer 226 is connected to the shaft 204 (FIGS. 5A and 5B). A discussion here of the piston 230 will aid in an understanding of the sensor roller 200, therefore, the remaining elements of the sensor roller will be described later.

Figure 6:
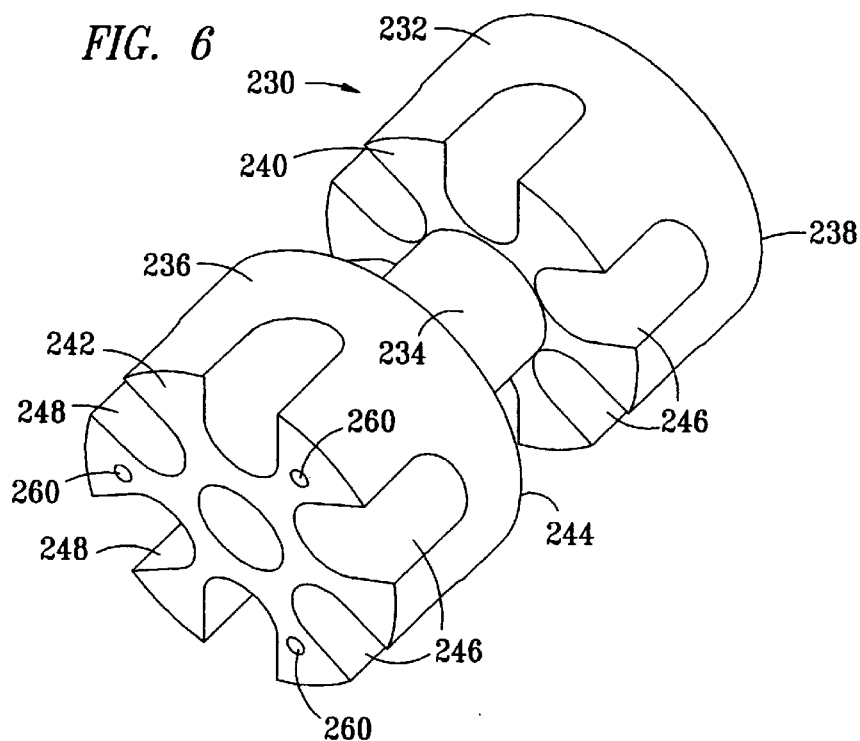
FIG. 6 is a perspective view of a piston utilized in the first embodiment of the sensor roller.

Referring to FIG. 6, there is shown a perspective view of the piston 230. The piston 230 includes a first section 232 integral with a hollow connecting shaft 234 that is integral with a second section 236, all preferably cylindrical in configuration. The first section 232 includes an outer end 238 and an inner end 240, where the outer end is adjacent the second retainer 226 (FIGS. 5A and 5B). Also, the second section 236 includes an outer end 242 and an inner end 244, where the outer end is adjacent the first retainer 224 (FIGS. 5A and 5B). A plurality of circular shaped grooves 246 are formed into the first section 232 and the second section 236 in one-to-one correspondence with the apertures of the first and second rows 208 and 210 (FIGS. 5A and 5B). The circular shaped grooves 246 are circumferentially positioned around the surface of the first and second sections 232 and 236 and have an sloped interior surface 248 extending from an outer surface of the first and second sections toward the outer ends 238 and 242.

Referring again to FIGS. 5A and 5B, where the piston 230 is illustrated in the interior chamber 222 of the cylindrical housing 202. A middle retainer 252 is fastened to the housing 202 and located between the first and second retainers 224 and 226. The middle retainer 252 engages the hollow connecting shaft 234 of the piston 230 such that the spherical actuators 212 of the second row 210 contact both the middle retainer 252 and the sloped interior surfaces 248 of the circular shaped grooves 246. Likewise, the spherical actuators 212 of the first row 208 contact both the first retainer 224 and the sloped interior surfaces 248 of the circular shaped grooves 246.

The piston 230 moves from the non-actuated position (FIG. 5A) to the actuated position (FIG. 5B) by the tray 10 depressing one or more of the spherical actuators 212. Depressing the spherical actuators 212 moves the piston 230 from the first retainer 224 and middle retainer 226 in the direction of the second retainer 226. The piston 230 returns to the non-actuated position when the tray 10 passes the sensor roller 200 by action of a spring 256 in contact with the first retainer 224 and engaging one end of a guide pin 254. The guide pin 254 passes through an opening in the first retainer 224 and is threaded into a pin opening 260 of the second section 236 of the piston 230. The spring 256 surrounds the portion of the guide pin 254 that extends from the first retainer 224 to an end 258 of the guide pin 254. The spring 256 has an expanded state to maintain and reset the piston 230 to the non-actuated position, and a compressed state when the piston is in the actuated position.

In the first embodiment of the present invention, there are three guide pins 254 and springs 256 (only one shown) that are separated by 120° such that the piston 230 is restrained from rotation and moves freely between positions. The position of each of the three guide pins is determined by the location of the pin openings 260 in the outer end 242 of the second section 236.

A sensor 262 is provided in the second retainer 226 to detect the presence of the piston 230 as a result of movement to the actuated position. Typically, the sensor 262 is a device such as a proximity sensor, or photoelectric switch that functions to distinguish the different positions of the piston 230 and generate a responsive detection signal. Preferably the sensor 262 is a proximity detector manufactured by General Electric, item number SS443A. A magnet strip 264 is secured to the outer end 238 of the first section 232 to activate the proximity detector when utilized as the sensor 262.

Reference is now made to FIGS. 7–10, where a second embodiment of the sensor roller 200 is illustrated using prime referenced numbers. The sensor roller 200' is similar to the first embodiment except for the configuration of the actuators 212', apertures of the rows 208' and 210', and the piston 230'. Also, the second embodiment does not require the guide pins 254 or the middle retainer 252.

Figure 7:
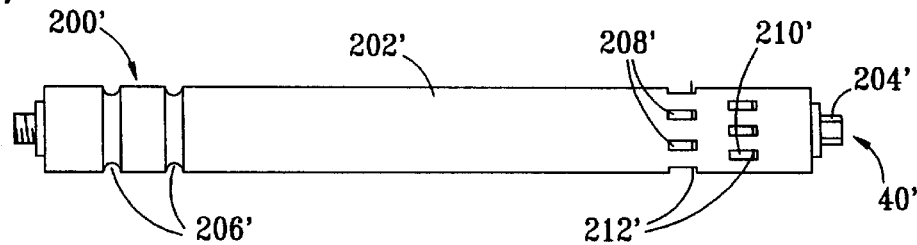
FIG. 7 is a side view of a second embodiment of the sensor roller.

Referring to FIG. 7, there is shown a side view of the second embodiment of the sensor roller 200'. The cylindrical housing 202' of the sensor roller 200' is preferably fabricated from a galvanized steel tube; however, other materials are acceptable. The sensor roller 200' further includes a shaft 204' that is spring loaded at the end 40' permitting easy removal and mounting of the sensor roller 200' within the side rails 22 and 24 (FIG. 1). Each sensor roller 200' includes a pair of channels 206' for placement of the O-ring bands 26 (FIG. 1) to interconnect adjacent rollers. The cylindrical housing 202' includes a plurality of apertures distributed in the first row 208' and second row 210'. The apertures of rows 208' and 210' each include an actuator 212' having an S-shaped configuration (FIG. 10) with an exposed portion 218' protruding therefrom.

Figure 8A:
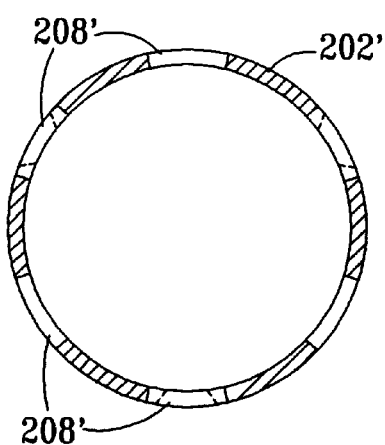
FIGS. 8A and 8B are cross-sectional views of the first and second rows of apertures of the second embodiment illustrated in FIG. 7.
Figure 8B:
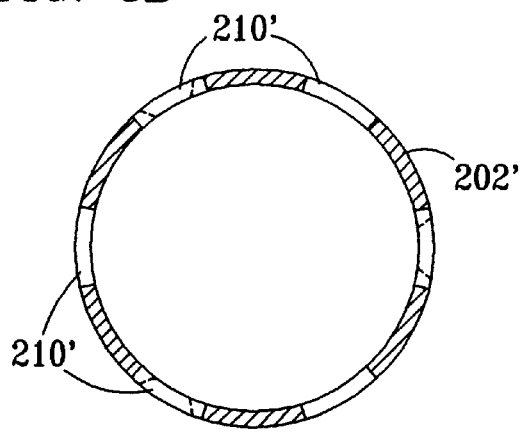
Figure 10:
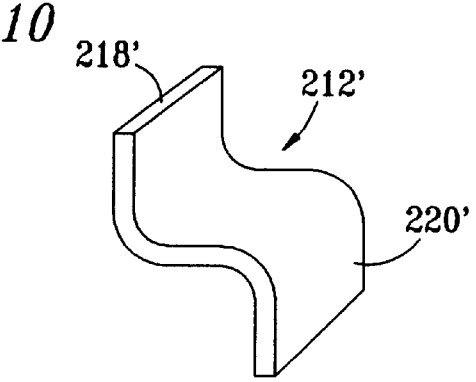
FIG. 10 is a perspective view of an actuator used in the second embodiment of the sensor roller.

Referring to FIGS. 8A and 8B, there are illustrated cross-sectional views of the first row 208' of apertures and the second row 210' of apertures, respectively. Each of the rows 208' and 210' preferably have six apertures with corresponding actuators 212' (FIG. 10). The first and second rows 208' and 210' are radially displaced from one another by approximately 60° from center-to-center. Individual dimensions of the apertures of the rows 208' and 210' are selected such that an opening appears on the surface of the cylindrical housing 202' over a majority of the circumference. This is accomplished by radially offsetting the apertures between rows 208' and 210' by approximately 30°.

Each aperture in the first row 208' and the second row 210' of the second embodiment preferably has a rectangular configuration to permit a portion 218' of the actuator 212' (FIG. 10) to protrude therefrom.

Figure 9A:
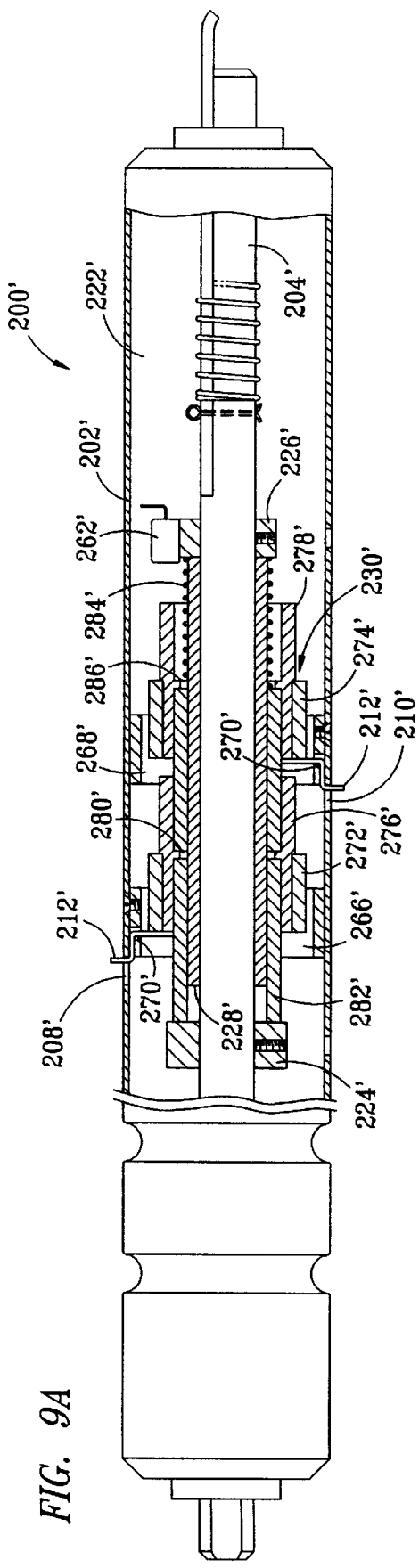
FIGS. 9A and 9B are lateral cross-section views of the sensor roller illustrated in FIG. 7, where the sensor roller is in the non-actuated position and the actuated position, respectively.
Figure 9B:
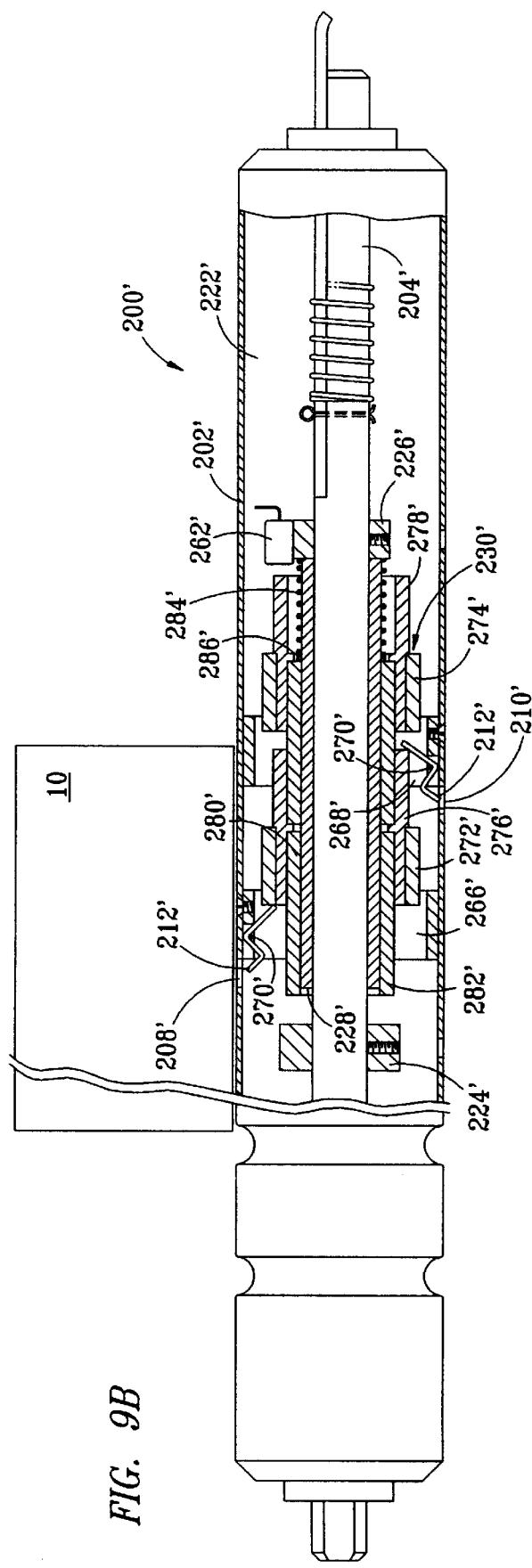

Referring now to FIGS. 9A and 9B, there are illustrated a lateral cross-section views of the sensor roller 200' in the non-actuated position and the actuated position, respectively. Located within the interior chamber 222' are a first retainer 224' and a second retainer 226' having a piston 230' slideably positioned in the cylindrical housing 202'.

Also provided are a first actuator retainer 266' and a second actuator retainer 268' that support actuators 212' that correspond in number with the first row 208' and second row 210' of apertures, respectively. The first and second actuator retainers 266' and 268' are fastened to the cylindrical housing 202' and have a plurality of support pivots 270' for actuators 212'. The actuator retainers 266' and 268' are configured to permit the piston 230' to pass through. As the actuators 212' rotate around the individual support pivots 270', the piston 230' is actuated to move between the non-actuated position (FIG. 9A) and the actuated position (FIG. 9B).

The piston 230' includes a first actuator bushing 272' and a second actuator bushing 274'. The first and second actuator bushings 272' and 274' respectively encompass and interconnect with first and second actuator couplings 276' and 278'. Each of the actuator couplings 276' and 278' has a respective tab 280' and 286' that extends inward of the actuator coupling. The tabs 280' and 286' engage an extension tube 282' having a slip fit with reference to the bushing 228'. The extension tube 282' is slideably positioned between a first retainer 224' and a second retainer 226'. A spring 284' encompasses a portion of the bushing 228' and is positioned between the second retainer 226' and the tab 286' of the second actuator coupling 278'.

The actuator bushings 272' and 274', actuator couplings 276' and 278' and extension 282' move from the non-actuated position (FIG. 9A) to the actuated position (FIG. 9B) when the tray 10 depresses one or more of the actuators 212'. The depressed actuators 212' rotate around the support pin 270' such that the interior portion 220' engages and moves the piston 230'. Thereafter, the piston 230' returns to the non-actuated position by action of the spring 284' to return or reset the piston 230' once the tray 10 passes the sensor roller 200'. The spring 284' has an extended state to maintain and reset the piston 230' to the non-actuated position, and a compressed state when the piston 230' is in the actuated position.

A sensor 262' is mounted to the second retainer 226' and responds to movement of the piston 230' to the actuated position. The sensor 262' may be any device such as a proximity sensor, or photoelectric switch that responds to the movement of the piston 230' and generates a detection signal.

While the present invention has been described with reference to the illustrated embodiments, it is not intended to limit the invention but, on the contrary, it is intended to cover such alternatives, modifications and equivalents as may be included in the spirit and scope of the invention as defined in the following claims.

What is claimed is:

1. A sensor roller for a conveyor system and responsive to the presence of an object travelling on the conveyor system, said sensor roller comprising:

a cylindrical roller housing having an interior chamber and a plurality of apertures;

a plurality of actuators in the interior chamber, each of said actuators having an exposed portion extending through one of the plurality of apertures, each of said plurality of actuators having said exposed portion and an interior portion;

a piston slideably positioned in the interior chamber of the housing and engaging the interior portion of the actuators, said piston moving from a non-actuated position to an actuated position in response to the object travelling along the conveyor system depressing the exposed portion of the actuator into the interior chamber;

means for biasing the piston toward the non-actuated position;

a sensor for sensing movement of the piston to the actuated position and for generating a detection signal in response thereto.

2. The sensor roller in accordance with claim 1 further comprising a shaft extending longitudinally through said housing, and a busing slideably mounted on said shaft.

3. The sensor roller in accordance with claim 1 wherein the plurality of apertures further includes a first row of apertures and a second row of apertures, said apertures of the first row offset from said apertures of the second row by an angular position such that the presence of the object on the cylindrical housing actuates the sensor.

4. The sensor roller in accordance with claim 3 further comprising a first actuator mount and a second actuator mount in one-to-one correspondence with the first and second rows of apertures, each actuator mount connected to the housing and having means for supporting a plurality of actuators.

5. The sensor roller in accordance with claim 1 further comprising a first retainer and a second retainer secured in the interior chamber, said piston slideably positioned between said first and second retainers.

6. The sensor roller in accordance with claim 5 wherein the means for biasing the piston in the non-actuated position comprises a spring positioned between the piston and the second retainer, the spring having an expanded state to maintain the piston in the non-actuated position and a compressed state when the piston moves to the actuated position.

7. The sensor roller in accordance with claim 5 wherein said second retainer further includes support for mounting the sensor.

8. The sensor roller in accordance with claim 7 further comprising a middle retainer secured in the interior chamber between the first retainer and the second retainer, said middle retainer engaging said piston to limit the sliding motion of said piston in the interior chamber.

9. The sensor roller in accordance with claim 8 wherein the piston further comprises:

a first section having an outer end and an inner end, said outer end positioned in proximity to the first retainer;

a second section having an outer end and an inner end, said outer end positioned in proximity to the second retainer;

a middle section connecting the first and second sections;

a plurality of grooves adjacent and in one-to-one correspondence with the plurality of apertures, said grooves located on the first or second sections to accommodate the plurality of actuators.

10. The sensor roller in accordance with claim 8 wherein the means for biasing the piston in the non-actuated position comprises at least one guide pin connected to said piston and passing through one of said retainers, a spring on said guide pin between an end thereof and the retainer, the spring having an expanded state to retain the piston in the non-actuated position and a compressed state when the piston slides to the actuated position.

11. The sensor roller in accordance with claim 10 further including a magnet fastened to the outer end of the second section of the piston, wherein the sensor responds to the presence of the magnet as the piston moves to the actuated position.

12. A modular conveyor system, comprising:

a plurality of conveyor sections, each including at least one sensor roller, each sensor roller including:

a cylindrical roller housing having an interior chamber and a plurality of apertures;

a plurality of actuators associated with the plurality of apertures, each of said plurality of actuators having an exposed portion and an interior portion;

a piston slideably positioned in the interior chamber of the housing and engaging the interior portion of said actuators, said piston moving from a non-actuated position to an actuated position in response to an object travelling along the conveyor system depressing the exposed portion of the actuator into the interior chamber;

means for biasing the piston in the non-actuated position;

a sensor for sensing movement of the piston to the actuated position and for generating a detection signal in response thereto; and each conveyor section including at least one drive roller;

means for connecting the at least one drive roller to each of the at least one sensor roller such that actuation of the drive roller actuates each sensor roller.

13. The modular conveyor system in accordance with claim 12 further comprising: each conveyor section including at least one idler roller; and means for connecting the drive roller or a sensor roller to each of the at least one idler roller.

14. A sensor roller for use in a conveyor system to detect the presence of a tray on the sensor roller, comprising:

a cylindrical roller housing having an interior chamber and a plurality of apertures;

a plurality of actuators in one-to-one correspondence with the plurality of apertures, each actuator having an exposed portion and an interior portion;

a piston disposed in the interior chamber of the housing and engaging each actuator, said piston moving from a non-actuated position to an actuated position in response to the tray travelling along the conveyor system depressing the exposed portion of at least one of the plurality of actuators into the interior chamber of the housing;

a spring-loaded bias for resetting and maintaining the piston in the non-actuated position; and a sensor for sensing the presence of the piston in the actuated position and for generating a detection signal in response thereto.

15. A method for sensing a tray located on a sensor roller, said tray traveling along a conveyor system, comprising the steps of:

depressing an actuator into an interior chamber of the sensor roller as the tray passes over the sensor roller;

actuating a piston within the interior chamber of the sensor roller in response to depressing the actuator, said piston moving from a non-actuated position to an actuated position until the tray passes the sensor roller;

resetting and maintaining the piston to the non-actuated position during an absence of contact between the tray and the actuator; and sensing the presence of the piston in the actuated position; and generating a detection signal in response to sensing the piston in the actuated position.

* * * * *